United States Patent [19]

Grandi

[11] Patent Number: 5,245,150
[45] Date of Patent: Sep. 14, 1993

[54] SELECTIVE REHEATING DEVICE FOR FOOD PRODUCTS

[76] Inventor: René Grandi, Loudon Ruy, Bourgoin Jallieu, France, 38300

[21] Appl. No.: 777,257

[22] PCT Filed: Jun. 11, 1990

[86] PCT No.: PCT/FR90/00409
§ 371 Date: Dec. 2, 1991
§ 102e Date: Dec. 2, 1991

[87] PCT Pub. No.: WO90/15536
PCT Pub. Date: Dec. 27, 1990

[30] Foreign Application Priority Data

Jun. 12, 1989 [FR] France .................. 89 07844
Apr. 17, 1990 [FR] France .................. 90 04986

[51] Int. Cl.⁵ .................................. B23K 15/10
[52] U.S. Cl. ................ 219/10.55 R; 219/10.55 A;
219/10.55 M; 221/6; 221/101; 221/150 HC;
99/357; 165/61; 165/63
[58] Field of Search ............... 219/10.55 R, 10.55 M,
219/10.55 A, 218, 386; 165/61, 63, 918, 919;
312/236; 221/150 HC, 6, 8, 101; 99/356, 357

[56] References Cited

U.S. PATENT DOCUMENTS

| | | | |
|---|---|---|---|
| 4,002,199 | 1/1977 | Jacobs | 219/218 |
| 4,398,651 | 8/1983 | Kumpfer | 219/10.55 R |
| 4,482,078 | 11/1984 | Reiss | 221/150 HC |
| 4,592,485 | 6/1986 | Anderson et al. | 219/10.55 R |
| 4,671,425 | 6/1987 | Knoll | 221/150 HC |
| 4,687,119 | 8/1987 | Juillet | 221/150 HC |
| 4,784,292 | 11/1988 | Johndrow et al. | 221/150 HC |
| 5,069,273 | 12/1991 | O'Hearne | 219/386 |
| 5,086,834 | 2/1992 | Grandi | 165/135 |

FOREIGN PATENT DOCUMENTS

| | | |
|---|---|---|
| 3625015 | 3/1988 | Fed. Rep. of Germany . |
| 2263699 | 10/1975 | France . |
| 2533811 | 10/1982 | France ............... 312/236 |
| 8806408 | 9/1988 | PCT Int'l Appl. . |
| 1170051 | 11/1969 | United Kingdom . |

Primary Examiner—Bruce A. Reynolds
Assistant Examiner—Tu Hoang
Attorney, Agent, or Firm—Sandler Greenblum & Bernstein

[57] ABSTRACT

Device for reheating and dispensing cooked meals arranged on a meal tray and stored on stand-by in a refrigerated enclosure. Each tray may contain different foodstuffs, and can therefore be selected by the consumer. Reheating is carried out by a sliding oven on an endless ballscrew, assisted by two slide rails. The oven moves in front of the selected tray. In the refrigerated enclosure, trays are stacked on shelves with slide rails, and an endless screw slides a camshaft provided with snugs so that it triggers the tray-moving mechanism, and a detector determines which snug corresponds to the selected tray. Once the snug is engaged in the mechanism the camshaft rotates from left to right and vice-versa to activate the mechanism's rocker bars which slide the tray into or out of the oven.

20 Claims, 4 Drawing Sheets

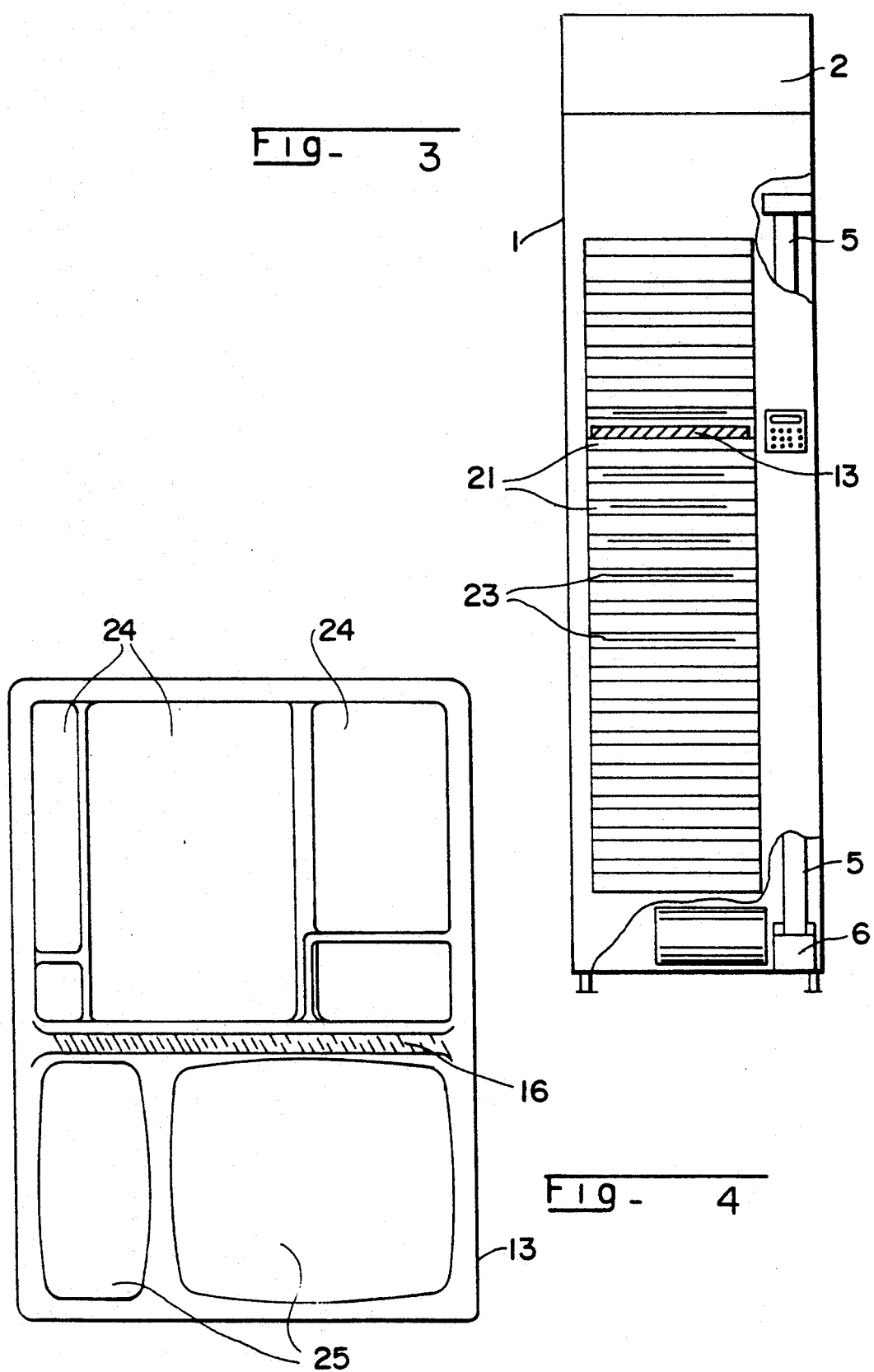

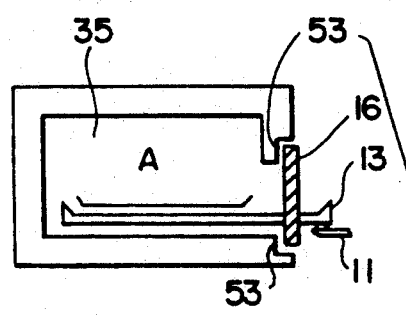
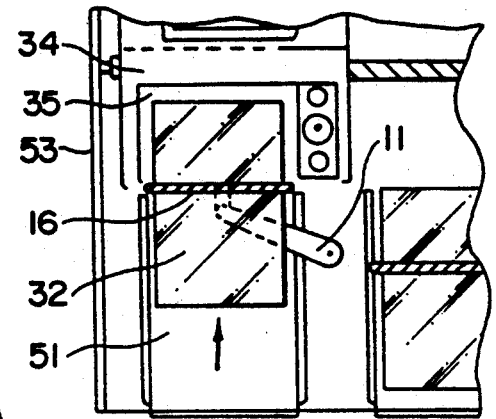
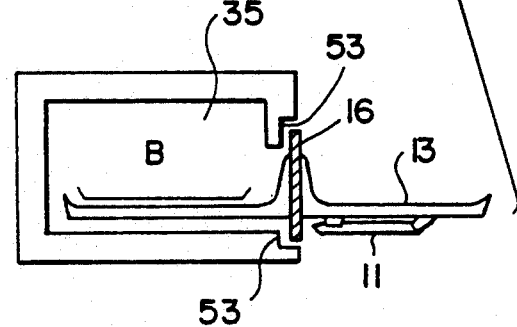
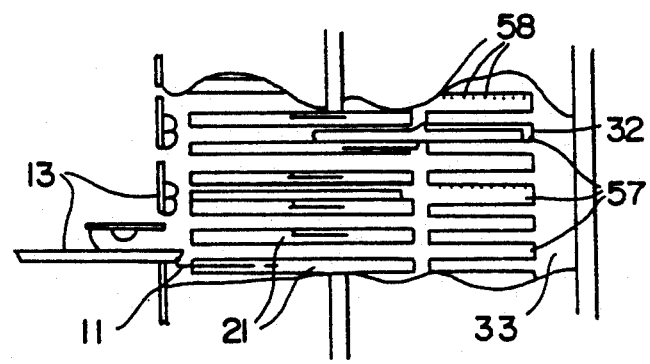
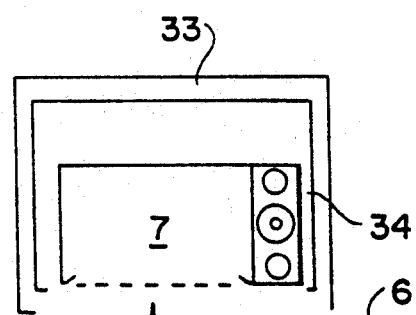
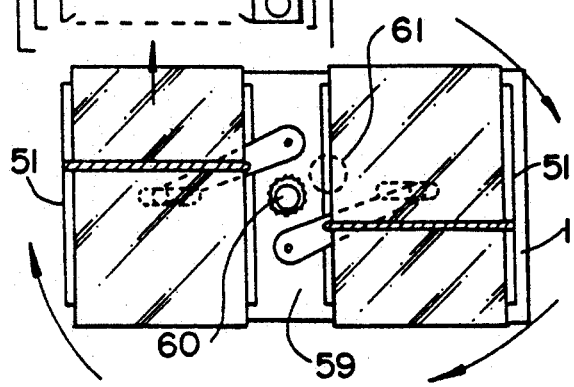

SELECTIVE REHEATING DEVICE FOR FOOD PRODUCTS

BACKGROUND OF THE INVENTION

1. Field of the Invention and Discussion of Background Information.

Various types of reheating devices are known utilizing heating mechanical such as microwave ovens, reheating of products stored on trays in a refrigerated enclosure. However, in these reheating devices the operation is performed manually, by introducing each tray that one wishes to heat in the microwave, for just the length of time necessary to reheat the products that it contains. This operation is both long and laborious.

Various types of vending machines for food products or cooked dishes are also known, which, once received by the consumer, are also introduced manually by the consumer into a microwave oven, in order to be reheated in it.

None of these devices are programmable. These devices cannot reheat dishes individually and automatically according to selective reheating sectors; and nor can they automatically dispense them to the consumer.

However, DE-A-3,625,015 describes an automatic device adapted to remove precooked food products, such as pizzas, hamburgers, fries, from a refrigerated enclosure by means of a journalled arm, and introduce these products into a microwave oven to reheat them or to complete their cooking. These products are then placed in a paper plate by virtue of a conveyor belt.

GB-A-1,170,051, describes an automatic dispensing machine for hot food products having of an enclosure that is thermally insulated and includes a storage system having horizontal guides in which mobile containers slide, which may be brought selectively into a microwave oven by means of a complex mechanism enabling horizontal and vertical movements to be combined. Once the articles are heated, they are simply removed from the oven by the consumer after opening an insulating door.

The common elements between the devices is that they use very complex means to manipulate the products to be reheated, and consequently, are subject to functional breakdowns. Further, these devices cannot be applied to the dispensing of meal trays that simultaneously include hot and cold dishes.

SUMMARY OF THE INVENTION

The device that is described according to the invention overcomes these disadvantages, and enables reheating and individual dispensing of a cooked dish, whether contained in a tray or not, and according to the choice of the consumer. The products to be reheated are stored in stand-by in a refrigerated enclosure.

The device according to the invention can be presented in the form of a dispensing cupboard, composed of a refrigerated enclosure in which a certain number of cooked dishes or trays containing complete meals are stacked on shelves in one or more columns, and one reheating zone for the dish to be warmed.

On the side, or at the rear of the stack of trays, an endless ball screw can be vertically positioned and parallel to the stack of trays.

This ball screw bears an oven, preferably a microwave oven, that can be displaced from top to bottom, or vice versa, such that it can stop in front of the tray that has previously been selected by the consumer. The displacement of the microwave is done by the rotation of this self lubricating endless screw and is activated at its base by a motor that can make it turn in one direction or in the other.

Moreover, various types of thermal energy may be envisioned other than a microwave, to reheat or to cook, such as infra-red burners, halogen tubes, induction heating, or any other system that can be adapted to it, and be efficient, while retaining the same system of entry of the trays.

For the latter types of heating, that are less expensive and less cumbersome, another variation of the cooking enclosure may be envisioned according to the manufacturing costs of the implementation. In particular each tray-bearing shelf can be equipped with a mini-oven with infra-red burners, halogen tubes, or other heating means, in which the tray penetrates. For this type of variation, no vertical or horizontal translation is necessary.

Two slide rails covered with a silicone based film enable the microwave oven to be maintained for better stability and precision in its sliding and guiding during vertical displacement.

The tray having been selected by the consumer, the microwave and its magnetron located in front of the tray, a tray moving mechanism located beneath the tray but not affixed to it makes the latter slide in order to introduce the zone that needs to be reheated into the microwave.

This mechanism is activated by a threaded rod and its motor which enables a cam shaft to slide downwardly and upwardly, such that snugs located on this cam shaft activate the mechanism located beneath the chosen tray. Once the mechanism has been activated, a motor located at the base of the cam shaft makes the latter rotate, activating the tray mechanism to displace it until the zone to be reheated is in the microwave.

Once the reheating is completed, rotation is done in the reverse direction, and the tray is removed outside the microwave to slide out a little further than its initial stand-by position, and is ready to be taken by the consumer.

A detector placed on the cam shaft determines and brings the snug equivalent to the chosen tray to activate the mechanism of the latter. This mechanism is composed of a support journalled by two rocker bars enabling perfect rotation for the displacement of the tray.

Two slide rails on each side of the tray and on the shelf enable the latter to undertake perfect displacement and guiding.

Once the selected zone of the tray is introduced in the microwave, a thermal barrier closes the entry of the microwave, and insulates the reheating zone and the refrigerated zone of the enclosure, such that heat is not dispersed among the frozen items, and also to enable a quicker reheating of the cooked dish. This thermal barrier also acts as a stop for the tray entering the microwave.

An accordion-shaped bellows fixed on the microwave and accompanying it in its vertical displacement insulates the refrigerated zone of the enclosure and the zone of circulation of the microwaves, so as to avoid the accumulated heat from being dispersed in the refrigerated zone.

A zone of-air forming a curtain enables cooling of the residual heat emanating from the microwave. The recycling of this heat is done by a sheath acting as a ventilator and an exhaust, and is cooled by the frozen items group.

According to a first variation that is particularly adopted to microwaves, the device is constituted of a dispersal cupboard comprising a refrigerated enclosure with several storage columns for meal trays. A horizontal motorized ball screw enables the assembly, the vertical ball screw and the slide rails maintaining the cooking or reheating oven, to undertake horizontal translation from left to right and vice versa, in order to translate the oven in front of the chosen column, the vertical ball screw then positions the oven in front of the meal tray containing the selected menu. The oven thus undertakes a horizontal translation and then a vertical translation.

The accordion shaped bellows accompanying the oven in its vertical displacement cannot be deployed during horizontal displacement. The oven and the accordion shaped bellows are thus partitioned in a box separating the heated cooking or reheating zone from the cold refrigerated zone. The box can only be displaced horizontally, by positioning itself in front of the chosen column. The oven is displaced vertically in the box so as to position itself in front of the chosen tray. The accordeon shaped bellows is guided by slide rails on its side in order to accompany the vertical displacement of the oven. This latter solution may be envisioned when different menus are presented in each storage column.

According to a second variation, the refrigerated storage zone may also be presented in the form of a turning storage device, consisting of double or even several columns, that pivot about a central axis in order to put the column of trays to be reheated in front of the heating zone comprising the thermal oven. Thus, the other column or columns can always be kept in refrigerated storage, and be reloaded at any time. A tension cable enables a winder to return the accordion-shaped bellows along its vertical displacement, the latter then passes into a coil equipped with a sponge soaked with a chlorine-based disinfectant product, so as to clean the bellows and to conserve the hygiene of the device.

A ventilation grill equipped with a filter, located at the base of the device, enables a turbine affixed to the translation box, to be ventilated so as to renew and cool the air of the box.

Another tangential turbine located on the upper portion of the box enables the evacuation of heat accumulated in the translation box comprising the oven, and it evacuates the heat outside the device. The targential turbine includes an exhaust outlet in front of each storage column. The opening of this outlet is done by a snug pushed by the horizontal displacement of the box of the oven. This lifting enables the flap of the outlet to be kept open, and at the same time, it enables the activation of the turbine.

The thermal barrier forming a deformation on the tray, and acting as a stop to the tray and the closure of the microwave oven enclosure, comprises a substantially thick, 18/10 type stainless steel band, in order to avoid leakage of the microwave. This stainless steel band is tightly adhered or fixed on the deformation of the tray but may also be fixed and inserted on the tray support, the latter overlapping the band by its deformation.

This barrier is tightly pressed and pressure-engaged against the periphery of the opening of the microwave oven enclosure, and is helped in this by the motorized tray-moving mechanism that enables the introduction of the selected zone of the meal tray to be cooked or reheated. The pressure exerted by this mechanism thus enables the enclosure to be maintained in a closed position during cooking.

The device that is the object of the invention can dispense all types of menus, such as complete meals, presented on a tray, with a cold appetizer and a hot dish to be cooked or to be reheated, as has already been described; however, a single dish may also be introduced in this device, then dispensed, such as cooked dishes like quiche, pizza or others. The latter are then placed on a drawer or a flat support whose external edge has the same deformation as that of the meal tray previously cited, with a stainless steel band to seal the entry of the oven, once the tray moving mechanism has penetrated it.

Since cooking or thawing by microwaves does not enable a product to become browned or gratinated, the oven for propulsion of the waves may be equipped with the grill to complete the browning process, as is already known in commercial microwave ovens.

Another variation: enables browning by a device located outside the refrigerated enclosure so as not to compromise the internal refrigerated zone. Here the browning is done after removal of the tray, by an infrared burner device allowing quick action.

These infra-red burners are located under the closure flaps of each shelf of meal trays. The opening of each flap is controlled by a gear journalled and connected to the tray-moving mechanism, whose displacement for removal occurs simultaneously with the opening of the flap, which is maintained in a horizontal position for gratinating by the infra-red burners. These are retracted during closure of the flap.

A journalled hood or cuff located on each opening flap of the shelf enables the user to be protected during operation of the infra-red burners.

The opening gear of the flap comprises a security mechanism mounted on shock absorbers to enable adjustment of the opening command of each flap. Being connected to the tray-moving mechanism, and after introduction of the latter, it maintains the flap in a closed position so that the user cannot open it without having specifically instructed the opening by means of a money slot or other means.

BRIEF DESCRIPTION OF THE DRAWINGS

In the annexed drawings, given as nonlimiting examples, some embodiments of the invention are described:

FIG. 3 shows a side view of the device.

FIG. 4 represents a plane of the tray.

FIG. 7 represents, at A, a drawer-flat support and at B, a meal tray, with a thermal barrier.

FIG. 8 shows in dotted and dashed lines, a tray introduced in the microwave for reheating.

FIG. 9 shows in dotted and dashed lines a variation of the device with a heating compartment for each shelf.

FIG. 10 represents another variation, with the device represented as a turning storage device.

DETAILED DESCRIPTION OF THE PREFERRED EMBODIMENTS

Figure 1:
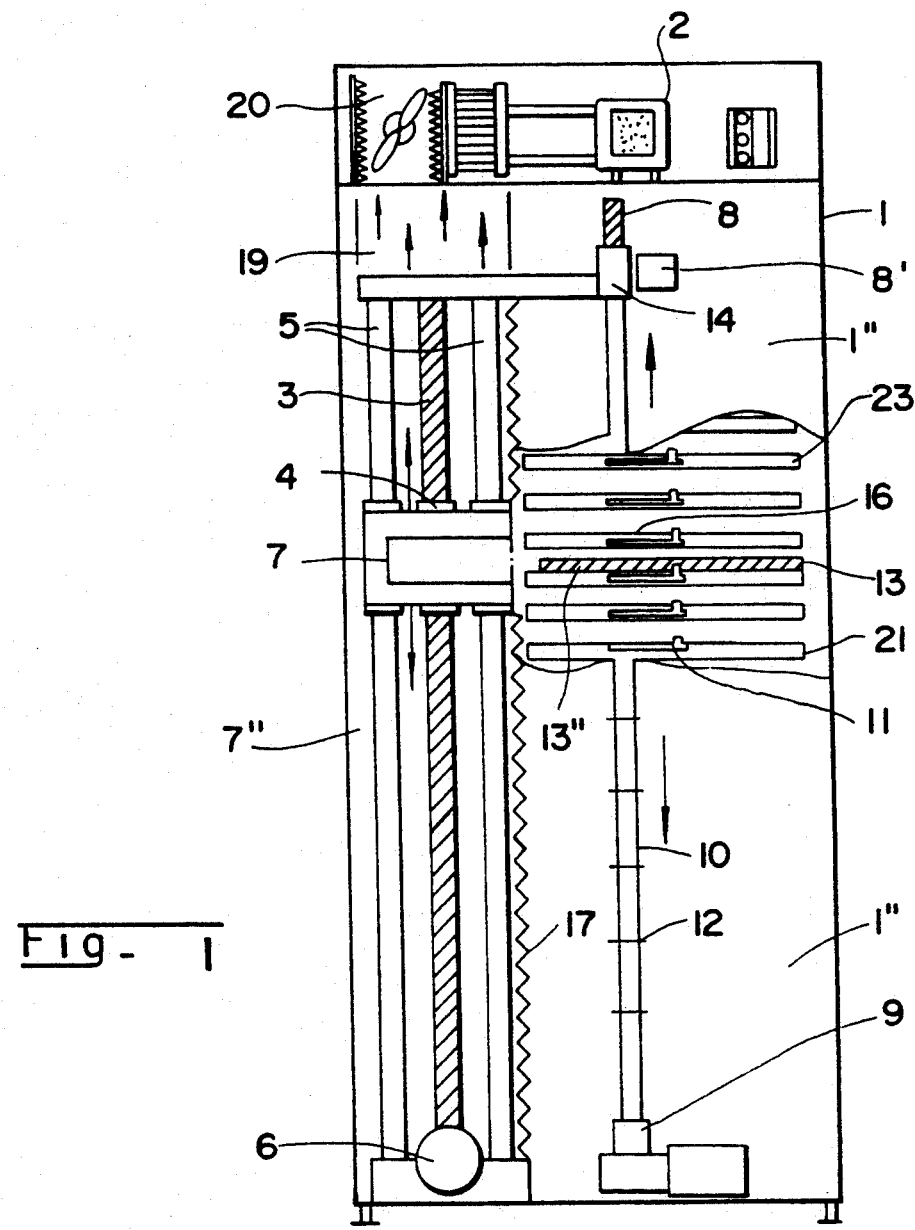
FIG. 1 represents the device in its entirety, seen in a transverse section.

The device of FIG. 1 comprises a refrigerated enclosure 1 for each frozen items group 2. An endless ball screw 3, enables vertical displacement of the microwave by a nut 4, bearing the microwave 7. The slide rails 5 covered with a silicone based film maintain and facilitate the displacement of the microwave 7, in order to ensure better stability and precision. The endless screw 3 is activated by a motor 6.

In parallel to this assembly, trays 13 are stacked on shelves 21 with slide rails 23.

The tray 13 moving mechanism 11 displaces the tray into the microwave 7, in order to reheat the product located in zone 13" of the tray. This mechanism 11 is activated by snugs 12 located on the cam shaft 10 activated by an endless screw 8 and its motor 8'. In order to be able to grip the mechanism 11 by its mount 12 of cam shaft 10, the latter undertakes a rotation activated by motor 9.

The detector 14 determines the choice of the tray to be reheated. A thermal barrier 16 located on the tray or not, acts as a stop to the tray entering the microwave, but this barrier also mainly acts to shut the microwave during reheating of the cooked dish.

An accordion shaped bellows 17 fixed on the microwaves and accompanying the latter in its vertical displacement insulates the refrigerated zone 1" from the circulation zone 7", thus avoiding the dispersed heat produced during reheating in the refrigerated zone 1". This heat passes through an air curtain 19 that cools it, and are then recycled in a ventilation sheath 20 and frozen items group 2.

Figure 2:
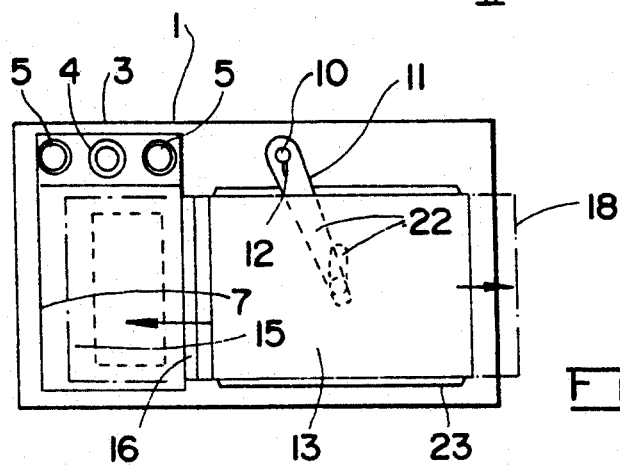
FIG. 2 shows a tray in movement.

In FIG. 2, tray 13 is represented in a position 15 penetrating inside microwave 7 and at exit position 18 for consumption. One can see the endless screw 3 in its nut 4 and the slide rails 5 for the vertical displacement of the microwave 7. It can also be noted that the mechanism 11 with its two rocker bars 22 and snug 12 of cam shaft 10 selecting the desired tray.

FIG. 3 represents a sectional view of the device, on the side of the microwave, a tray 13 is placed on a shelf 21 comprising slide rails 23, and is on stand-by in the refrigerated enclosure 1 by the frozen items section 2. We can see a portion of slide rails 5 of the microwaves, these being covered with silicone films. The motor 6 enables vertical displacement of the microwaves that are positioned here in front of tray 13, ready to receive it.

FIG. 4 illustrates the plane of tray 13 with sections 24, containing products that remain cold, the thermal barrier 16 acting as stop and closure for reheating in the microwave.

The sections 25 receive the cooked dishes to be reheated. These sections are recessed for better reheating. The number of sections can be the same and is not limiting.

Figure 5:
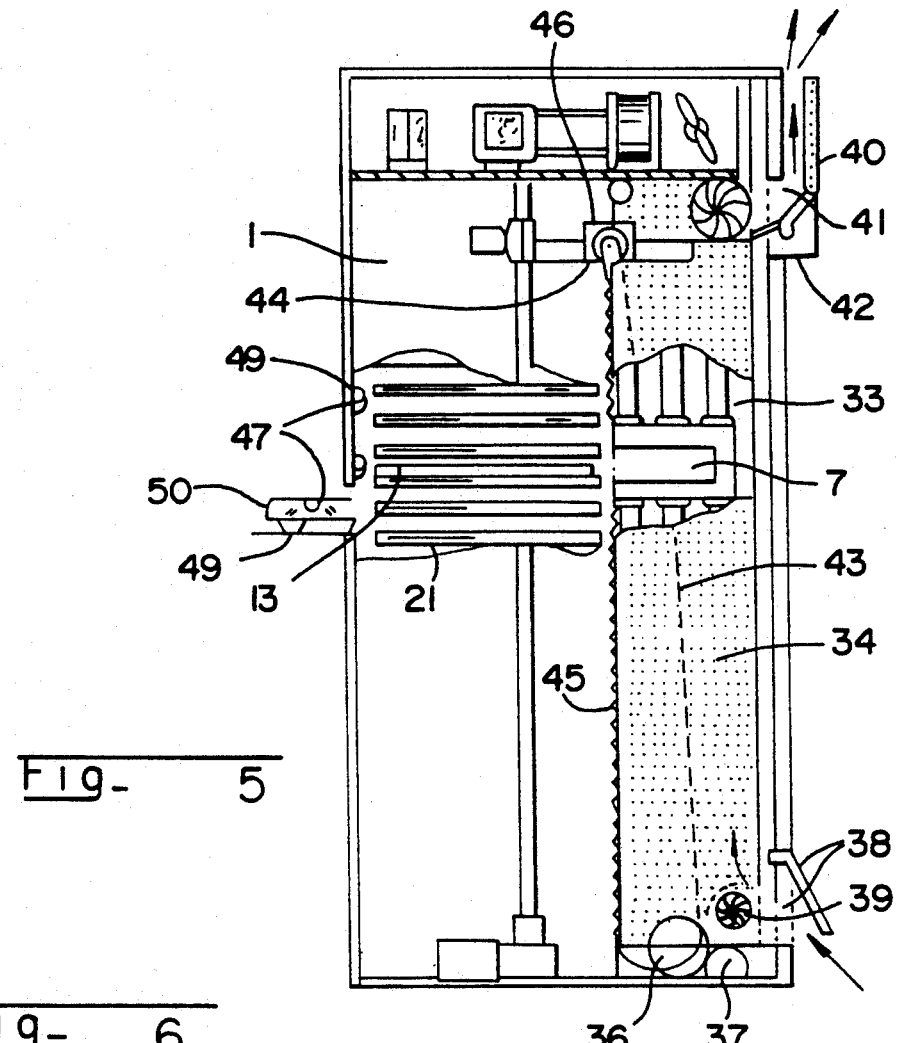
FIG. 5 illustrates a sectional view of the device in its entirety, seen from the side.

FIG. 5 represents a refrigerated enclosure 1 for storage of meal trays 13 and heating zone 33 with the horizontal translation box 34, in which the microwave oven 7 is displaced vertically. The ball screw 36 driven by motor 37 enables horizontal displacement of the assembly constituted by box 34 and oven 7. At the base of the device, a grill and its ventilation filter 38 are located, as well as turbine 39. The upper tangential turbine 40 evacuates the heat outside box 34 by exhaust 41, opened by snug 42.

The tension cable 43 of winder 44 enables the return of the accordion shaped bellows 17 that passes into a coil 46 for cleaning of the bellows. The flaps 47 of each shelf 21 comprise infra-red burners 49, as well as a journalled hood 50.

Figure 6:
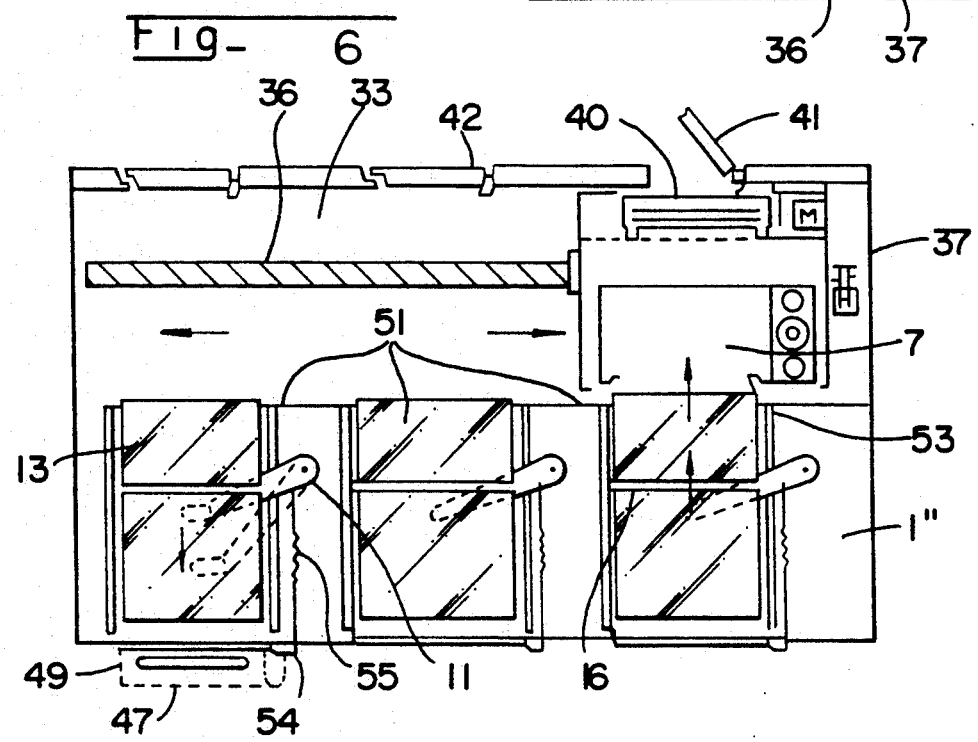
FIG. 6 represents a sectional top view of the device, in one of its variations, with horizontal displacement.

FIG. 6 shows an assembly with three storage columns 51, located side by side, each with a meal tray 13 in stand-by in the refrigerated zone 1". Each tray 13 has its thermal barrier 16 activated in notch 53 of the periphery of oven 7 for cooking or reheating. The moving mechanism 11 of each tray is synchronized with the gear 54 with shock absorber 55 for opening flap 47, under which is housed the infra-red burner 49. In the heating zone 33, the ball screw 36 and its motor 37 enables the translation of box 34 and of heating oven 7. The exhaust 41 is opened by the passage of box 34 by means of a snug 42, the tangential motorized turbine 40 being activated simultaneously to evacuate the heat outside the device.

At A and B of FIG. 7, we can see a drawer-flat support as well as a meal tray 13, each introduced in oven 7, their thermal barrier 16 being activated in notch 53 of the periphery of the oven. The movement and the maintenance of the closure of the oven is done by the moving mechanism 11.

In FIG. 8, box 34 positions itself in front of the storage column 51, the meal tray 13 is introduced in oven 7 by the moving mechanism 11, the thermal barrier 16 is positioned in notch 53 of oven 7.

The variation of FIG. 9 shows a mini-oven 57 for each shelf 21 of meal tray 13. Each of these mini-ovens is provided with its own source of thermal energy 58. There is no need for vertical or horizontal translation here. However, the introduction and the removal of the meal is still done by the moving mechanism 11.

The variation of FIG. 10 shows a turning device 59, with two storage columns 51 located on opposite sides. They pivot about a central axis 60 driven by a motor 61 to position themselves in front of box 34 and of oven 7 of the heating zone 33 which does not pivot, because only the refrigerated portion 1 is pivotable. The reheating oven 7 is then displaced vertically to position itself in front of the selected tray.

The positioning of the various constitutive elements gives this device an optimum number of useful effects that, up until now, have not been obtained by similar devices.

I claim:

1. Automatic device adapted to remove food products form a refrigerated compartment using a journalled system, in order to introduce the food products into an oven in order to reheat or complete cooking of the food products, and to remove the food products to put them at disposal of a consumer, comprising:

an enclosure containing at least one refrigerated zone and at least one heating zone;

at least one storage column located in said at least one refrigerated zone including at least one shelf for holding at least one tray for food products;

at least one oven constructed and arranged to slide in at least in one of a vertical and horizontal direction to a position in front of at least one tray selected by a consumer on said at least one shelf;

at least one moving mechanism located beneath at least one tray to be heated, and arranged to introduce at least one zone of at least one tray to be heated into said at least one oven, and to remove at least one tray from said at least one oven;

a vertical cam shaft mounted for rotation by a first motor located at its base, and mounted to slide in upward and downward directions by association of an endless screw activated by a second motor, said cam shaft including a plurality of snugs that are constructed and arranged whereby sliding of said cam shaft causes at least one of said plurality of snugs to activate said at least one moving mechanism located beneath at least one tray to be heated; and a detector positioned on said cam shaft for determining and bringing at least one of said plurality of snugs corresponding to a desired at least one tray to be heated to activate said at least one moving mechanism positioned beneath the desired at least one tray.

2. Device as defined by claim 1, including an endless ball screw activated by a motor and slide rails for permitting vertical sliding of said at least one oven to a position in front of at least one tray selected by a consumer on said at least one shaft.

3. Device as defined by claim 2, wherein said slide rails are covered with a silicone based film.

4. Device as defined by claim 1, wherein said at least one moving mechanism comprises two rotatable rocker bars activated by said cam shaft and a motor, and during exit of at least one tray, said at least one moving mechanism locates the at least one tray at a position further than its initial position prior to insertion into said at least one oven for being taken by a consumer.

5. Device as defined by claim 1, further including a plurality of trays.

6. Device as defined by claim 5, wherein said at least one tray includes a thermal barrier and at least one zone to be reheated.

7. Device as defined by claim 6, wherein said at least one heating zone and said at least one refrigerated zone are insulated from each other by said thermal barrier which acts as a stop for entry of said at least one tray, and by an accordion-shaped bellows having a portion fixed on said at least one oven to travel with said at least one oven to separate said at least one refrigerated zone from said at least one heating zone of said enclosure.

8. Device as defined by claim 1, wherein said at least one storage column comprises a plurality of storage columns in said refrigerated zone, and said at least one oven is vertically slidable in a box in said at least one heating zone to a position in front of a desired at least one tray, which is introduced into said at least one oven by said at least one moving mechanism.

9. Device as defined by claim 8, wherein said plurality of storage columns are positioned side by side, and further including a horizontal endless screw to effect horizontal translation of said box and said at least one oven for positioning in front of one of said plurality of storage columns.

10. Device as defined by claim 9, including means for evacuating heat from said at least one heating zone.

11. Device as defined by claim 10, wherein said means for evacuating heat comprise a motorized tangential turbine affixed to said box.

12. Device as defined by claim 11, wherein said means for evacuating heat further comprise a covering over an exhaust which is liftable by the horizontal translation to open said exhaust.

13. Device as defined by claim 8, wherein said plurality of storage columns are associated with a turning mechanism rotatable about a central axis driven by a motor to position a storage column of said plurality of storage columns in front of said box which is fixed in said at least one heating zone.

14. Device ad defined by claim 1, wherein a gratinating mechanism comprising an infra-red tube is positioned beneath a flap whose opening is synchronized with extraction of a tray by a gear with an adjusting shock absorber and by said at least one moving mechanism.

15. Device as defined by claim 6, wherein said thermal barrier comprises a stainless steel band with substantial thickness that is adapted to be inserted into a notch of said at least one oven, and maintained in a closed position by pressure exerted by said at least one moving mechanism.

16. Device as defined by claim 1, wherein said at lest one storage column comprises a plurality of storage columns in said at least one refrigerated zone, said at least one oven comprises a plurality of mini-ovens, said mini-ovens sliding horizontally in a box to a position in front of a storage column of said plurality of storage columns containing a desired at least one tray for introduction into one of said plurality of mini-ovens by said at least one moving mechanism, and each mini-oven of said plurality of mini-ovens equipped with an individual energy source.

17. Device according to claim 16, wherein said plurality of mini-ovens are all of the same type.

18. Device according to claim 17, wherein said plurality of storage columns contain a number of shelves which correspond to the number of mini-ovens.

19. Device as defined by claim 1, including means for evacuating heat from said at least one heating zone.

20. Device as defined by claim 10, wherein said means for evacuating heat comprise a motorized tangential turbine affixed to said box.

* * * * *